US007123166B1

(12) United States Patent
Haynes et al.

(10) Patent No.: US 7,123,166 B1
(45) **Date of Patent: *Oct. 17, 2006**

(54) METHOD FOR MANAGING A PARKING LOT

(76) Inventors: Michael N. Haynes, 2707 Curzon Ct., Vienna, VA (US) 22181; Pamela E. Haynes, 2707 Curzon Ct., Vienna, VA (US) 22181

( * ) Notice: Subject to any disclaimer, the term of this patent is extended or adjusted under 35 U.S.C. 154(b) by 0 days.

This patent is subject to a terminal disclaimer.

(21) Appl. No.: 10/961,128

(22) Filed: Oct. 8, 2004

(51) Int. Cl.
*B60Q 1/48* (2006.01)

(52) U.S. Cl. .................. 340/932.2; 340/933; 340/937; 348/143; 348/148; 348/152

(58) Field of Classification Search ............ 340/932.2, 340/933, 937; 348/143, 148, 152
See application file for complete search history.

(56) References Cited

U.S. PATENT DOCUMENTS

| | | | | |
|---|---|---|---|---|
| 5,706,367 | A * | 1/1998 | Kondo | 382/236 |
| 5,910,817 | A * | 6/1999 | Ohashi et al. | 348/159 |
| 6,501,391 | B1 * | 12/2002 | Racunas, Jr. | 340/932.2 |
| 6,570,608 | B1 * | 5/2003 | Tserng | 348/143 |
| 6,816,085 | B1 * | 11/2004 | Haynes et al. | 340/932.2 |
| 6,975,220 | B1 * | 12/2005 | Foodman et al. | 340/531 |

* cited by examiner

*Primary Examiner*—Daryl C Pope
(74) *Attorney, Agent, or Firm*—Michael Haynes PLC; Michael N. Haynes

(57) ABSTRACT

A method is disclosed for managing a parking lot. In one disclosed embodiment, the method includes receiving parking lot data. The embodiment of the disclosed method also includes transforming the parking lot data into parking lot information, the parking lot information including information about a moving parking lot object. Further, the embodiment of the disclosed method includes transmitting a map of the parking lot to a mobile interaction device, and transmitting the parking lot information to the mobile interaction device.

47 Claims, 5 Drawing Sheets

METHOD FOR MANAGING A PARKING LOT

RELATED APPLICATIONS

This application claims priority to, and incorporates by reference herein in its entirety, U.S. Provisional Application No. 60/176,031, now abandoned, filed 14 Jan. 2000, and titled "Method for Managing a Parking Lot", and co-pending U.S. patent application Ser. No. 09/714,452, filed 17 Nov. 2000, and titled "Method for Managing a Parking Lot".

BACKGROUND

Shopping at traditional bricks-and-mortar retailers is currently under pronounced assault, particularly by the advent of on-line retailers. A substantial cause is likely the numerous inefficiencies associated with shopping at traditional stores, particularly given the increasing intolerance of today's shoppers to indulge time-wasting activities.

Often the inefficiencies associated with shopping at a traditional store begins before a shopper walks into the store. Upon pulling into the store's parking lot, shoppers often spend substantial time trying to locate a parking space. This loss of time can be exacerbated when an apparently empty parking space is taken by another driver or contains a shopping cart, broken glass, or other parking impediment. Upon parking, the driver, and possibly the passengers, must spend additional time walking to the store entrance. After shopping, still more time is spent walking from the store to the shopper's vehicle.

The inefficiencies further include the time wasted by traveling to a store, only to find that the store does not have an expected product. Even if the store normally carries the product, shoppers all too frequently discover that the item is currently out-of-stock, or not on the shelves. Moreover, finding a store employee to check the store's inventory for a normally-stocked product that is absent from its shelf location can be unduly time-consuming. Even if the desired item is on the shelf, if the shopper is unfamiliar with the store, the shopper often must spend substantial time locating the item within the store.

Moreover, shoppers can lose substantial amounts of time waiting to check-out of a store. Typically, with little more than a hunch to guide them, shoppers select one of numerous check-out lines, hoping the selected line will minimize the shopper's check-out wait. All too often, shoppers guess incorrectly, judging by the expressions of frustration frequently heard in check-out lines. These frustrations can be heightened when a shopper discovers that a chosen check-out line is restricted to a certain number of items, or to cash-only shoppers.

Shoppers have few, if any, means for reducing or eliminating these, and other, inefficiencies commonly associated with shopping at traditional stores, short of foregoing shopping at these stores altogether. Thus, there is need for devices, methods, and/or systems for improving the efficiency of shopping at traditional stores.

DETAILED DESCRIPTION

A method is disclosed for managing a parking lot. In one disclosed embodiment, the method includes receiving parking lot data. The embodiment also includes transforming the parking lot data into parking lot information and transmitting the parking lot information to an interaction device.

Figure 1:
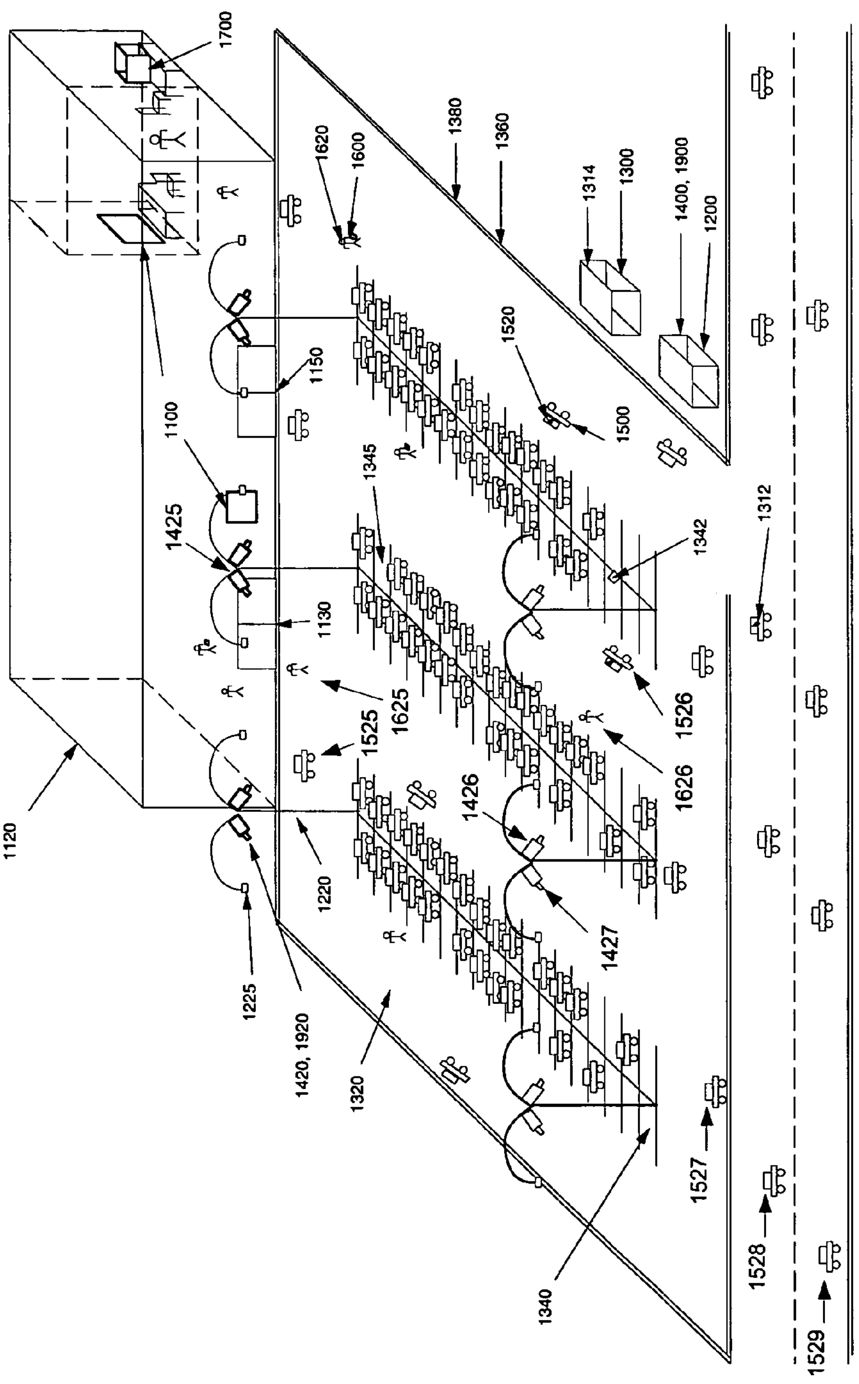
FIG. 1 is a perspective view of an embodiment of a System 1 from outside a building.

FIG. 1 is a perspective view of an embodiment of a System 1, which can include a building 1120, which can have one or more building interaction devices 1100 that can communicate with system interaction device 1700 to input, output, and/or exchange data, or data that has been processed into information. Building 1120 can be any building, including a residential, governmental, industrial, and/or commercial building, such as, for example, a house, an apartment building, a retail store, a hospital, and/or an office building.

Building 1120 can be associated with a parking lot 1320, which can have one or more well-known video input devices 1420, such as a video camera, aimed thereupon. Parking lot 1320 can include any well-known area and/or structure designated for the parking of vehicles, such as, for example, a parking garage, an outdoor parking area, and/or a moving parking structure, such as an automobile transport.

Each video input device 1420 can be mounted, for example, on a pole 1220 upon which parking lot lights 1225 are mounted. In one or more alternative embodiments (not shown), video input device 1420 can be mounted on an outside wall of building 1120, a parking structure, such as a wall, column, and/or beam, and/or other locations that allow video input device 1420 a view of at least a portion of parking lot 1320. Thus, video input device 1420 can be mounted to a permanent and/or stationary object and/or structure, or to a moving object, such as a vehicle.

Well-known video input device 1420 can include, be connected to, be coupled to, and/or provide a video signal to, one or more well-known video interaction devices 1400. Known video interaction devices 1400 can control various parameters of video input device 1420. Video input device 1420 can be stationary or movable. For example, video camera can translate, swivel, and/or tilt. Moreover, video input device 1420 can be aimed at a fixed location or can pan across a range of locations. Furthermore, video input device 1420 can zoom in and out.

Video input device 1420 can be configured to perceive and/or output polarized or unpolarized light. Moreover, video input device 1420 can be configured to perceive and/or output light of any spectrum, including infrared, visible, and ultraviolet light. The video data output by video input device 1420 can be in black and white and/or color. Moreover, video data can be output at any frame speed, such as for example, thirty frames per second.

Video input device 1420 and/or video interaction device 1400 can output analog and/or digital video data in a signal sent to system interaction device 1700, which can be located, for example, inside building 1120. One or more video interaction devices 1400 can process the output of video input device 1420, and can be used, for example, to filter, transform, enhance, interpret, recognize, compress, and/or encrypt the video data output. Each video interaction device 1400 can process continuously, at selected times, at selected locations, and/or as commanded. Commands can be input to video input device 1420 and/or video interaction device 1400 locally and/or from distant locations such as, for example, system interaction device 1700. Commands can include, for example, "translate 8 inches left", "translate 36 inches down", "swivel 20 degrees left", "tilt 10 degrees down", "zoom in 30%", "shift spectrum 10% down", "filter out blue & higher", "increase contrast 16%", "output black & white", "frame speed 60", "cancel noise", "pattern recognition on", "symbolize objects", "underlay map", "MPEG compression on", "encryption on", etc.

In another embodiment of system 1, one or more well-known audio input devices 1920, such as a microphone, can be located, positioned, and/or directed to obtain audio data from parking lot 1320, building 1120, and/or nearby areas. Each audio input device 1920 can be mounted on a pole 1220 upon which parking lot lights 1225 are mounted. In one or more alternative embodiments (not shown), audio input device 1920 can be mounted on an outside wall of building 1120, a parking structure, such as a wall, column, and/or beam, and/or other locations that allow video input device 1420 access to sounds from at least a portion of parking lot 1320. Thus, audio input device 1920 can be mounted to a permanent and/or stationary object and/or structure, or to a mobile object, such as a vehicle.

Audio input device 1920 can include, be connected to, be coupled to, and/or provide a signal to an audio interaction device 1900, which can include well-known audio processing capabilities. Upon receipt of audio data transmitted in a signal from audio input device 1920, audio interaction device 1900 and/or any other interaction device can perform well-known functions, such as filtering, enhancing, transforming, recognizing, interpreting, compressing, and/or encrypting the audio data contained in the audio signal into audio information. Moreover, the audio data and/or information can be transmitted to any interaction device. Each audio interaction device 1900 can process continuously, at selected times, at selected locations, and/or as commanded.

In one embodiment, audio input device 1920 can be attached to or integral to video input device 1420. In another embodiment, audio input device 1920 can be separate from video input device 1420. In yet another embodiment, audio interaction device 1900 can be included in video interaction device 1400. In yet another embodiment, the functions of an audio interaction device 1900 can be provided by video interaction device 1400.

Audio input device 1920 can be stationary or movable. For example, audio input device can translate, swivel, and/or tilt. Moreover, audio input device 1920 can be aimed at a fixed location or can pan across a range of locations. Furthermore, audio input device 1920 can magnify or attenuate received audio signals to respectively increase or decrease its "listening ability". Audio input device 1920 can be configured to perceive and/or output sound of any frequency. Moreover, sound data can be input and/or output at any sampling rate, such as for example, 44 kHz.

Audio input device 1920 and/or audio interaction device 1900 can output analog and/or digital audio data. Commands can be input to audio input device 1920 and/or audio interaction device 1900 locally and/or from distant locations such as, for example, system interaction device 1700. Commands can include, for example, "translate 8 inches left", "translate 36 inches down", "swivel 20 degrees left", "tilt 10 degrees down", "magnify 30%", "shift sound spectrum 10% down", "filter out 7 kHz & higher", "sampling rate 88 kHz", "cancel noise", "pattern recognition on", "symbolize sounds", "underlay background sounds", "compression on", "encryption on", etc.

Parking lot 1320 can include a plurality of parking spaces 1340. Parking lot 1320 can also include one or more parking impediments 1360, such as, for example, parked vehicles, curbs, walls, barricades, shopping carts, shopping cart corrals, broken glass, etc. Parking lot 1320 can also include one or more driving impediments 1380, such as, for example, moving or parked vehicles, curbs, walls, barricades, shopping carts, broken glass, potholes, speed bumps, pedestrians, pedestrian crossings, etc. Vehicles 1520 can park in or among parking spaces 1340. Vehicles 1520 can include, for example, automobiles, trucks, tractors, mobile construction and/or agricultural equipment, and the like. One or more vehicles 1520 can include a vehicle interaction device 1500.

Vehicles 1520 can transport one or more persons 1620, such as drivers, and/or passengers. Persons 1620 can also include, for example, building tenants, guests, vendors, service personnel, employees, shoppers, patrons, customers, clients, and/or patients. One or more persons 1620 can carry a personal interaction device 1600, which can be designed to be hand-held and/or attached to the clothing and/or body of person 1620.

As shown in FIG. 1, video input device 1425 can simultaneously monitor person 1625 and vehicle 1525. From the perspective of at least video input device 1425, moving person 1625 can at least partially block, obscure, and/or overlap the view of simultaneously moving vehicle 1625. Similarly, from the viewpoint of video input device 1426, the view of one or more moving parking lot objects, such as vehicle 1526, can be at least partially blocked, obscured, and/or overlapped by simultaneously moving person 1626. From the viewpoint of video input device 1427, the view of one or more moving objects, such as vehicles 1528 and 1529, can be at least partially blocked, obscured, and/or overlapped by at least moving vehicle 1527.

At any given time, one or more of parking spaces 1340 can be empty. Moreover, one or more parking spaces 1340 can be an optimal parking space 1345 for a given vehicle 1520. There are numerous factors that can be considered to determine which empty parking space 1340 is an optimal parking space 1345. For example, an optimal parking space 1345 can be a parking space 1340 that is the closest empty parking space 1340 to an entrance 1130 of building 1120. In another embodiment, an optimal parking space 1345 can be a parking space 1340 that is the closest empty parking space 1340 to an exit 1150 of building 1120. Because driving a vehicle through a parking lot can sometimes be slower than walking through the parking lot, in yet another embodiment, an optimal parking space 1345 can be a parking space 1340 into which a driving person 1620 can pull a moving vehicle 1520, park that vehicle 1520, and walk to an entrance 1130 of building 1120 in the shortest time.

Parking lot data and/or information can include video data and/or information. Instead, or in addition, parking lot data and/or information can include audio data and/or information. As vehicle 1520 approaches lot 1320, vehicle 1520 can subscribe to parking lot data and/or information. Vehicle 1520 can request that a parking interaction device 1300, video interaction device 1400, and/or system interaction device 1700 indicate and reserve an optimal parking space 1345 for vehicle 1520. This request can be made at any time and/or at any distance of vehicle 1520 from space 1345. For example, vehicle 1520 can request from parking interaction device 1300 an optimal parking space 1345 when vehicle 1520 is zero to five minutes away from parking lot 1320. By way of further example, vehicle 1520 can reserve optimal parking space 1345 when vehicle 1520 is two minutes from parking space 1345, and/or optimal parking space 1345 can be indicated to vehicle 1520 when vehicle 1520 is twenty seconds from lot 1320.

Moreover, the interaction device can discourage other vehicles from entering a reserved parking space. For example, parking lot 1320 can include an indicator 1342 for each parking space 1340. Indicator 1342 can be integral to and/or attached near parking space 1340. For example, indicator 1342 can be attached to a wall, pole, sign, and/or pavement of or near parking space 1340. In an alternative embodiment, indicator 1342 can appear on a map or other representation of parking lot 1320. Indicator 1342 can use any well-known method of indicating including, for example, a display indicating the word "Reserved".

Furthermore, the interaction device (1300, 1400, and/or 1700) can enforce its reservations. For example, in one embodiment, parking interaction device 1300 can direct a towing service to tow a vehicle that violates a "Reserved" indication. In another embodiment, parking interaction device 1300 can issue, or cause to be issued, a parking ticket to a vehicle 1520 that parks in a reserved parking space 1340 without authorization.

By way of further example, parking interaction device 1300 can also meter the use of each parking space 1340 and/or of lot 1320. For example, parking interaction device 1300 can recognize a vehicle 1520 that enters lot 1320 and/or space 1340, and charge vehicle 1520 a parking fee. In one embodiment, these functions are implemented using one or more well-known beacons 1312 placed on or in vehicle 1520, and one or more well-known readers located 1314 on, over, and/or near parking lot 1320 and/or each parking space 1340. One example of technology that can be adapted to this activity without undue experimentation is the "Smart Tag" system (on the Web at fastoll.com/smart.htm) that now employs transponders within moving vehicles to collect tolls from those vehicles on the Dulles Tollroad in Northern Virginia. Parking interaction device 1300 can charge a vehicle 1520 based on any of several criteria including, for example, length of time in parking lot 1320, length of time in parking space 1340, desirability of parking space 1340, indicating an optimal parking space 1345, reserving an optimal parking space 1345, etc.

Well-known lighting interaction device 1200 can control one or more of parking lot lights 1220. For example, lighting interaction device 1200 can brighten a group of parking lots lights 1220 that illuminate a selected area of parking lot 1320. By way of further examples, on command from building interaction device 1100, lighting interaction device 1200 can brighten one or more parking lot lights 1220 to assist retail store employees in retrieving shopping carts, cleaning up litter, unloading a delivery truck, etc. Similarly, on command from parking interaction device 1300, lighting interaction device 1200 can brighten one or more parking lot lights 1220 to make an indicator 1342 more visible. On command from video interaction device 1400, lighting interaction device 1200 can brighten or dim one or more parking lot lights 1220 to provide better lighting conditions for perceiving one or more objects or persons in parking lot 1320, or assist a vehicle 1520 navigate within parking lot 1320. On command from a vehicle interaction device 1500, lighting interaction device 1200 can brighten one or more parking lot lights 1220 in the vicinity of a vehicle 1520 to discourage the presence of loiterers, vandals, and/or thieves. On command from a personal interaction device 1600, to enhance security for a person 1420 leaving building 1120, lighting interaction device 1200 can brighten one or more parking lot lights 1220 along an actual and/or expected path from building 1120 to the vehicle 1520 of person 1420. On command from system interaction device 1700, lighting interaction device 1200 can dim or shut-off one or more parking lot lights 1220 to save energy. On command from a audio interaction device 1500, lighting interaction device 1200 can brighten one or more parking lot lights 1220 in the vicinity of a particular sound event.

Figure 2:
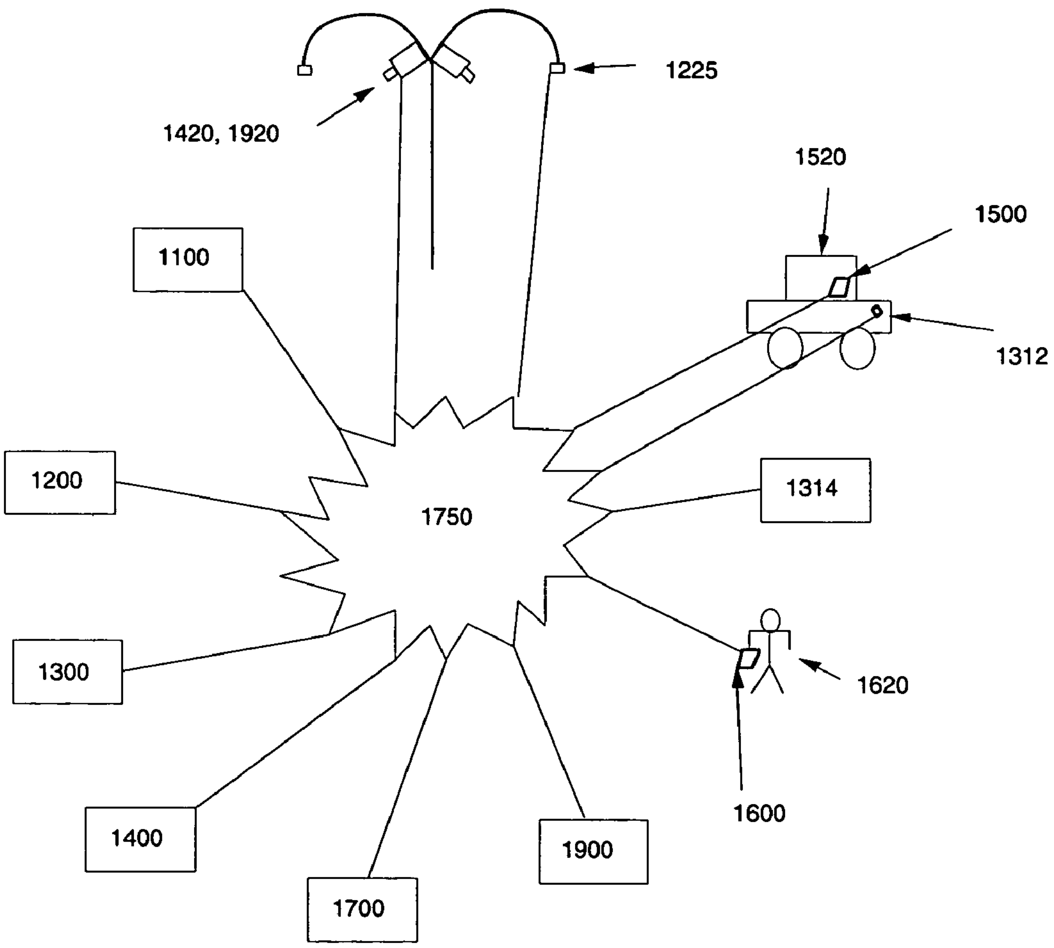
FIG. 2 is a block diagram of an embodiment of System 1.

FIG. 2 is a block diagram of an embodiment of system 1 wherein one or more video input devices 1420 and/or video interaction devices 1400 can send video data (not shown) to system interaction device 1700. To do so, each video input device 1420 and/or video interaction device 1400 can connect via camera network interface (shown in FIG. 3) through a network 1750 to a system interaction device network interface (shown in FIG. 3) connected to system interaction device 1700.

Similarly, one or more audio input devices 1920 and/or audio interaction devices 1900 can send audio data (not shown) to system interaction device 1700. To do so, each audio input devices 1920 and/or audio interaction devices 1900 can connect via audio network interface (shown in FIG. 3) through a network 1750 to a system interaction device network interface (shown in FIG. 3) connected to system interaction device 1700.

Network 1750 can have any architecture, including a direct connection, a local area network, a wide area network such as the public switched telephone network and/or the Internet, and/or a combination thereof. Network 1750 can be a packet-switched, a circuit-switched, a connectionless, or connection-oriented network or interconnected networks, or any combination thereof. Network 1750 can be oriented toward voice, data, or voice and data communications. Moreover, a transmission media of network 1750 can take any form, including wireline, satellite, wireless, or a combination thereof.

In one embodiment, each video input device 1420 and/or video interaction device 1400 can send video data directly to system interaction device 1700 using, for example, any well-known broadcast method, including radio-frequency (RF) waves, such as employed, for example, in the IEEE 802.11 standard. In yet another embodiment, each video input device 1420 and/or video interaction device 1400 can be directly connected, for example, via an RS-232 connection to a dedicated port (not shown) on system interaction device 1700. Each audio input device 1920 and/or audio interaction device 1900 can send audio data in similar manners.

One or more vehicle interaction devices 1500 can exchange data, and/or data that has been processed into information, with system interaction device 1700. To do so, each vehicle interaction devices 1500 can connect via vehicle wireless network interface (shown in FIG. 3) through wireless network 1750 to system interaction device wireless network interface 1705 connected to system interaction device 1700. In another embodiment, vehicle interaction device 1500 can connect via vehicle wireless network interface (shown in FIG. 3) to an alternative wireless network (not shown) that operates at a different frequency than network 1750.

In one embodiment of System 1, vehicle interaction device 1500 can gather vehicle data, and/or vehicle data processed into vehicle information, from vehicle 1520. Vehicle data can include location data provided by, for example, a global positioning system (GPS) device associated with vehicle 1520. By way of further example, location data can be provided by beacon 1312 and/or reader 1314 by, for example, triangulating a position of a beacon 1312 using three or more readers 1314.

Moreover, vehicle data can include status data, such as whether the vehicle's engine is running, which can be indicated by Engine=Off, or Engine=On. Similarly, the gear the vehicle is in can be indicated by Gear=Park, Gear=Reverse, Gear=Neutral, Gear=Drive, etc. Likewise, the status of the vehicle's parking brake can be indicated by P-brake=Off, P-brake=On, etc. The status of the vehicle's brakes can be indicated by Brake=Off, Brake=0.1On, Brake=0.5On, Brake=0.9On, Brake=1On, etc., where the number can indicates a proportion of full braking power. The status of the vehicle's accelerator can be indicated similarly by Accel=Off, Accel=0.1On, Accel=0.25On, Accel=0.5On, etc., where the number can indicate a proportion of full throttle. The status of the vehicle's speed can be indicated by a number such as 2, 5, 20, 45, which can indicate the vehicle's speed in miles per hour or kilometers per hour.

The status of the vehicle's directional indicator can be indicated by Blinker=Off, Blinker=Left, Blinker=Right, etc. The status of the vehicle's steering wheel can be indicated by S-wheel=Neutral, S-wheel=0.1Right, S-wheel=0.5Right, S-wheel=1.0Right, S-wheel=0.1Left, S-wheel=0.5Left, S-wheel=1.0Left, etc., where the number can indicate a proportion of the steering wheel's full turning capacity in the designated direction. The status of the vehicle's parking lights can be indicated by P-lights=Off, P-lights=On. Similarly, the status of the vehicle's head lights can be indicated by H-lights=Off, H-lights=Lo, H-lights=Hi. The status of the vehicle's ventilation fan can be indicated by Fan=0.2On, Fan=0.5On, Fan=0.8On, Fan=1On, etc., where the number can indicates a proportion of full ventilation speed. The status of the vehicle's cabin temperature can be indicated by a number indicating that temperature, such as 25 F, 68 F, 75 F, 15 C, 35 C, etc. The status of the vehicle's cabin temperature set-point can be indicated similarly, or as a proportion of full heating temperature or full cooling temperature. The status of the vehicle's front windshield can be indicated as W-shield=Clear, W-shield=Wet, W-shield=Fogged, W-shield=Iced, etc.

In a similar manner to the preceding examples, status data, or status data that has been processed into status information, can be indicated for other vehicle systems, measurements, and controls, including cabin humidity, trip odometer, odometer, fuel level, oil level, coolant temperature, coolant level, battery charge, electrical short, electrical leak, brake fluid level, transmission fluid temperature, transmission fluid level, hazard indicator, defroster, front wipers, rear wipers, windshield washer, rear window washer, door locks, trunk lock, window positions, driver's side mirror position, passenger's side mirror position, rear-view mirror position, seat position, seat incline, seat height, lumbar support, radio power, radio volume, radio input source (AM, FM, cassette, CD), antenna position, gas cap, security alarm, glass integrity, tire pressure, maintenance needed indicator, proximity detectors (i.e., devices that indicate the distance from the vehicle to an object such as a person, vehicle, animal, curb, or other potential obstruction), etc.

In addition to collecting vehicle data and/or information, vehicle interaction device 1500 can send commands (control signals), and/or forward commands sent from system interaction device 1700 and/or personal interaction device 1600, to one or more vehicle controls. For example, vehicle interaction device 1500 can send an Engine=On command to the ignition switch, causing the ignition switch to turn on, thereby starting the engine. Subsequently, vehicle interaction device 1500 can send commands such as P-brake=Off, Brake=0.5On, H-lights=Lo, Hazard=On, S-Wheel=Neutral, Gear=Reverse, Accel=0.1On, etc., to start vehicle 1520 in motion backing out of a parking space. One or more video input devices 1420 can, for example, provide video data regarding the location, path, speed, and acceleration of vehicle 1520 to system interaction device 1700, vehicle interaction device 1500, and/or personal interaction device 1600. Similarly, one or more audio input devices 1920 can, for example, provide audio data regarding the location, path, speed, and acceleration of vehicle 1520 to system interaction device 1700, vehicle interaction device 1500, and/or personal interaction device 1600. The video data can be processed into video information and the audio data can be processed into audio information. The video data and/or information, the audio data and/or information, and/or the vehicle data and/or information, can be used to determine additional commands to send to one or more vehicle controls. This determination can be made by any interaction device, including, for example, system interaction device 1700, vehicle interaction device 1500, and/or personal interaction device 1600. Examples of commanding a vehicle can be found at U.S. Pat. No. 5,448,487 (Arai); U.S. Pat. No. 5,912,980 (Hunke); U.S. Pat. No. 5,983,161 (Lemelson); and/or U.S. Pat. No. 5,170,352 (McTamaney), which are incorporated herein by reference in their entirety.

One or more parking interaction devices 1300 can exchange data, or data that has been processed into information, with system interaction device 1700. To do so, each parking interaction device 1300 can connect via parking wireless network interface (shown in FIG. 3) through wireless network 1750 to system interaction device wireless network interface (shown in FIG. 3) connected to system interaction device 1700. In another embodiment, parking interaction device 1300 can connect via parking wireless network interface (shown in FIG. 3) to an alternative wireless network (not shown) connected to system interaction device 1700 that operates at a different frequency than network 1750. Moreover, any or all of parking interaction devices 1300 can connect to system interaction device 1700 via any of many well-known wireline transmission methods. For example, any or all of parking interaction devices 1300 can connect via a building network interface (not shown) to a wireline network (not shown), such as Ethernet, connected to a system interaction device wireline network interface (not shown) that is connected to system interaction device 1700. In another embodiment, each parking interaction device 1300 can be wired directly to a dedicated port (not shown) on system interaction device 1700.

One or more personal interaction devices 1600 can exchange data, or data that has been processed into information, with system interaction device 1700. To do so, each personal interaction device 1600 can connect via personal wireless network interface 1605 through wireless network 1750 to system interaction device wireless network interface 1705 connected to system interaction device 1700. In another embodiment, personal interaction device 1600 can connect via personal wireless network interface 1605 to an alternative wireless network (not shown) connected to system interaction device 1700 that operates at a different frequency than network 1750. In one embodiment, personal interaction device 1600 can be a Palm Pilot. In another embodiment, personal interaction device 1600 can be an Apple iBook employing the AirPort wireless networking interface.

One or more building interaction devices 1100 can communicate with system interaction device 1700 to input, output, and/or exchange data, or data that has been processed into information. To do so, any or all of building interaction devices 1100 can connect via building wireless network interface (shown in FIG. 3) through wireless network 1750 to system interaction device wireless network interface (shown in FIG. 3) connected to system interaction device 1700. In another embodiment, any or all of building interaction devices 1100 can connect via building wireless network interface (shown in FIG. 3) to an alternative wireless network (not shown) connected to system interaction device 1700 that operates at a different frequency than network 1750. Moreover, any or all of building interaction devices 1100 can connect to system interaction device 1700 via any of many well-known wireline transmission methods. For example, any or all of building interaction devices 1100 can connect via a building network interface (not shown) to a wireline network (not shown), such as Ethernet, connected to a system interaction device wireline network interface (not shown) that is connected to system interaction device 1700. In another embodiment, each building interaction devices 1100 can be wired directly to a dedicated port (not shown) on system interaction device 1700.

Thus, building interaction device 1100, lighting interaction device 1200, parking interaction device 1300, video interaction device 1400, vehicle interaction device 1500, and/or personal interaction device 1600 can receive and/or can exchange data and/or information directly with each other.

System interaction device 1700 can receive parking lot data and/or information for a single parking lot 1320, or any combination of parking lots 1320. Also, system interaction device 1700 can receive parking lot data and/or information for a single parking lot 1320, or any combination of parking lots 1320. System interaction device 1700 can exchange data, or data that has been processed into information, with one or more interaction devices including, for example, building interaction devices 1100, one or more lighting interaction devices 1200, one or more parking interaction devices 1300, one or more video interaction devices 1400, one or more vehicle interaction devices 1500, one or more personal interaction devices 1600, and/or one or more audio interaction devices 1900. Also, one or more interaction devices can exchange data, or data that has been processed into information, with each other.

Data and/or information can be exchanged between interaction devices via any well-known data communication protocol, including TCP/IP, HTTP, HTTPS, and/or WAP. Data and/or information can be formatted for viewing on interaction devices via any well-known presentation protocol, including SGML, HTML, and/or XML. Moreover, data and/or information can be viewed using any well-known viewer running on an interaction device, including a browser. Moreover, data and/or information can be processed using any well-known software application running on an interaction device and/or on network 1750, including Java and/or Javascript. Also, data and/or information can be stored and/or accessed using any well-known database application running on one or more interaction devices and/or network 1750, including an SQL relational database application.

Figure 3:
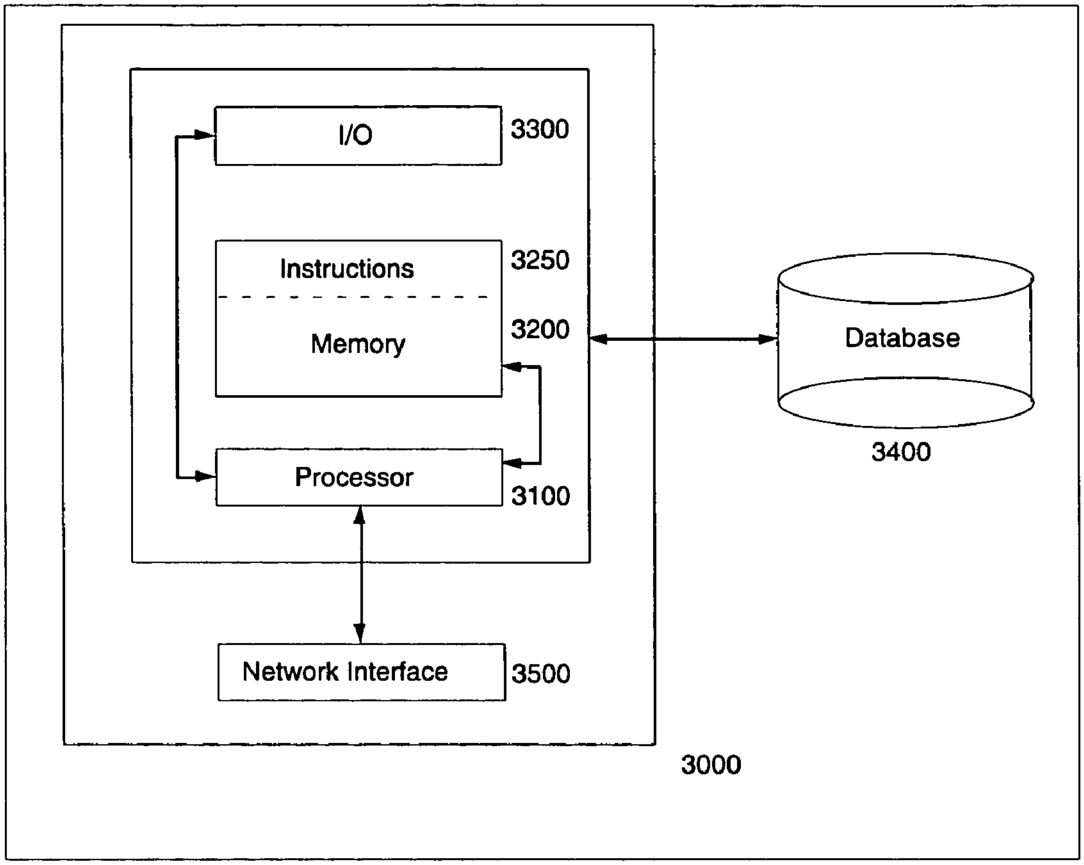
FIG. 3 is a block diagram of an embodiment of an interaction device of System 1.

FIG. 3 is a block diagram of a typical interaction device 3000, and can represent building interaction device 1100, lighting interaction device 1200, parking interaction device 1300, video interaction device 1400, vehicle interaction device 1500, personal interaction device 1600, and/or system interaction device 1700.

Any interaction device 3000 can be portable, mobile, stationary, and/or fixed, and can also be referred to as an information device. Also, any interaction device 3000 can include a number of components, including one or more processors 3100, one or more memories 3200, and/or one or more input/output (I/O) devices 3300. Memory 3200 can include instructions 3250 that are adapted to be executed by processor 3100. In one embodiment, each of the components of interaction device 3000 can be housed together. In an another embodiment, any component of interaction device 3000 can be housed apart from any or all other components of interaction device 3000.

In one embodiment, processor 3100 can be a general purpose microprocessor, such a Pentium series microprocessor manufactured by the Intel Corporation of Santa Clara, Calif. In another embodiment, processor 3100 can be an Application Specific Integrated Circuit (ASIC) which has been designed to implement in its hardware and/or firmware at least a part of a method in accordance with an embodiment of the present invention.

Memory 3200 can be any well-known device capable of storing analog and/or digital data and/or information, including, for example, a hard disk, Random Access Memory (RAM), Read Only Memory (ROM), flash memory, a compact disk, a magnetic tape, a floppy disk, and any combination thereof. Moreover, memory 3200 can be coupled to processor 3100, and can contain instructions adapted to be executed by processor 3100. Furthermore, memory 3200 can contain data upon which processor 3100 can operate. Also, memory 3200 can contain parallel processing instructions to cause multiple processors 3100 to execute instructions in parallel.

Input/output (I/O) device 3300 can be any well-known I/O device, including, for example, a monitor, display, keyboard, keypad, touchpad, pointing device, microphone, speaker, video camera, camera, scanner, printer, and/or port to which an I/O device can be attached or connected.

Interaction device 3000 can include and/or be connected to one or more databases 3400.

Interaction device 3000 can communicate with another interaction device or devices via network interface 3500. In another embodiment, interaction device 3000 can communicate with another interaction device by connecting directly to the other interaction device.

Interaction device 3000 and/or the software running thereon can provide and/or display a user interface, such as a graphical user interface, which can include scrollable windows, pull-down menus, icons, dialog boxes, buttons, and/or hyperlinks, etc. The user interface can display data, information, notifications, alerts, recommendations, and/or advice, etc. An examplary user interface can include a map or other representation of parking lot 1320 (not shown in FIG. 3). Underlaying, overlaying, and/or included on the map can be parking lot objects. The user interface can allow a user to select a parking lot object to obtain data and/or information about that object, including, for example, live, delayed, and/or time-lapsed video data and/or information about that object. For instance, a representation of a tricycle can be symbolically displayed as a slow-decay, flashing yellow triangle via a graphical user interface. If a user viewing the graphical user interface does not recognize the tricycle symbol, the user can select the unrecognized symbol and receive a textual, verbal, photographical, animated, videographic, and/or audio identification and/or description of the tricycle. Receiving such data can be particularly valuable when the system is unable to specifically recognize the tricycle and instead symbolizes the tricycle using the system's designated "unrecognized object" symbol, such as a black border surrounding red circle. In this instance, a user can, for example, click on the tricycle and a live video feed of the tricycle (the unrecognized object) can be displayed.

Any interaction device or combination of interaction devices can be capable of "learning" by way of adaptive learning and/or other features of neural networks. For example, by virtue of adaptive learning, a vehicle interaction device can "learn" that there is a high statistical likelihood that a particular husband will request a parking space that is bordered by empty parking spaces. The same vehicle interaction device can also learn that there is a high statistical likelihood that the husband's wife will request a well-lit parking space that is closest to a building entrance. Recognizing these implied preferences, the "educated" interaction device can automatically recommend a parking space that comforms with the expected desires of a current driver of the couple's vehicle. As another example, a building interaction device can learn through highly correlated past events and experiences that, in reaction to audio data corresponding to a vehicle crash, and video information suggesting a vehicle is in contact with another vehicle, a light pole, and/or a building, etc., the building interaction should call 911 immediately instead of waiting to be told to do so. As yet another example, an interaction device can learn to recognize, characterize, and/or report certain parking lot objects and/or events, such as the occurence of rain, hail, snow, frost, an object left on a roof of a car without being secured, a driver's face, etc. Further examples of neural network characteristics, such as adaptive learning, are disclosed in U.S. Pat. No. 6,144,910 (Scarlett), U.S. Pat. No. 6,134,525 (Iwahashi), U.S. Pat. No. 6,092,919 (Calise), U.S. Pat. No. 6,081,750 (Hoffberg), U.S. Pat. No. 6,058,352 (Lu), U.S. Pat. No. 5,986,357 (Myron), U.S. Pat. No. 5,946,675 (Sutton), U.S. Pat. No. 5,920,477 (Hoffberg), U.S. Pat. No. 5,901,246 (Hoffberg), U.S. Pat. No. 5,850,470 (Kung), each of which is incorporated herein by reference in its entirety.

Figure 4:
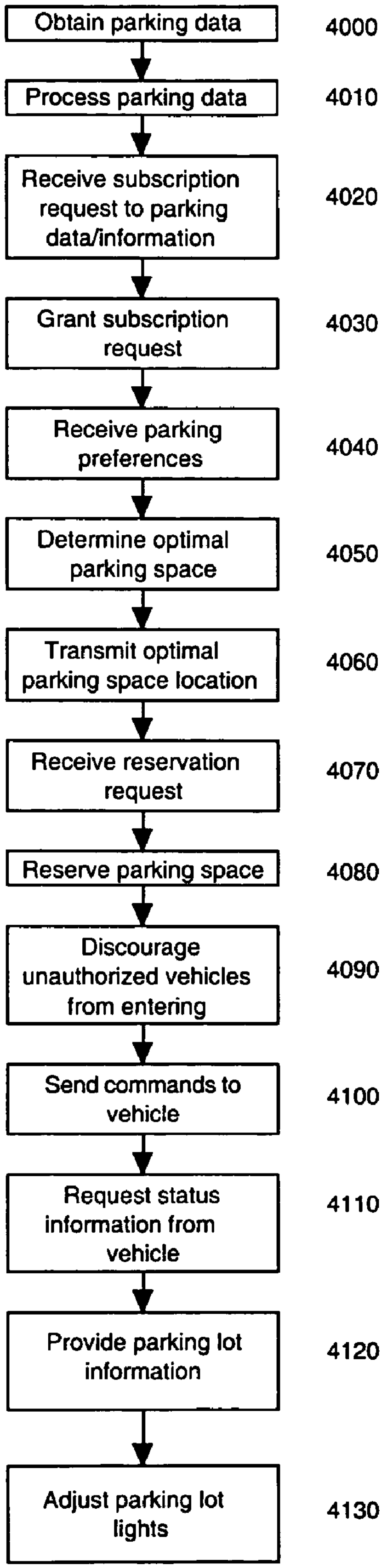
FIG. 4 is a flowchart of an embodiment of a Method 4.

FIG. 4 is a flowchart of an embodiment of a method 4. Those steps described as occurring at system interaction device 1700 can occur at video interaction device 1400 instead or also. Also, any steps of method 4 can be omitted, or combined with any other steps of method 4 without departing from the intended scope of the invention. Further, no particular sequence is necessarily required for performing the steps of method 4.

At step 4000, video input device 1420 and/or video interaction device 1400 can obtain and transmit video data and/or information to system interaction device 1700, video interaction device 1400, vehicle interaction device 1500, and/or personal interaction device 1600.

At step 4010, system interaction device 1700, video interaction device 1400, vehicle interaction device 1500, and/or personal interaction device 1600 can process received video data into video information.

As an illustrative example, system interaction device 1700 and/or video interaction device 1400 can implement one or more well-known pattern recognition algorithms to identify vehicles, empty parking spaces, curbs, shopping carts, pedestrians, broken glass, standing water, ice, and other parking and/or driving impediments, encode these items as symbolic objects, and place the symbolic objects on a symbolic or actual representation of the parking lot, such as a map showing an aerial view of the parking lot. For example, vehicles can be encoded as solid red rectangles, parking spaces can be encoded as clear rectangles bordered by white on three sides, empty parking spaces can be shown with a flashing or cascading green hash pattern through them, pedestrians can be encoded as solid orange circles, etc.

Moreover, graphical indicators such as colors, shapes, patterns, fills, outlines, borders, highlights, intensities, flashing, cascading, fading, wiping, and other well-known graphical indicators can be used to identify and/or distinguish various objects. Graphical indicators can range in sophistication from the simplistic to photo-realistic, and can include features such as shading, reflectance, transparancy, real-time motion, and/or animation. Text can be provided as well, and can include various fonts, styles, sizes, colors, highlights, and other well-known text features to identify and/or distinguish various objects. In one embodiment, audio information, indicators, and/or notifiers can also be included, and can be linked to one or more graphical indicators. As another illustrative example, one or more well-known video and/or audio pattern recognition algorithms can be employed to distinguish moving objects from stationary objects.

Examples of pattern recognition can be found in U.S. Pat. No. 5,497,314 (Novak); U.S. Pat. No. 5,828,769 (Burns); U.S. Pat. No. 5,675,663 (Koerner); U.S. Pat. No. 5,877,969 (Gerber); U.S. Pat. No. 5,982,934 (Villalba); U.S. Pat. No. 5,974,175(Suzuki); U.S. Pat. No. 5,675,661 (Richman); and/or U.S. Pat. No. 5,923,791 (Hanna), which are incorporated herein by reference in their entirety.

At step 4020, system interaction device 1700 can receive one or more subscription requests for the parking lot data and/or information. A subscription request can be received from one or more building interaction devices 1100, vehicle interaction devices 1500, and/or personal interaction devices 1600. The subscription can be continuous or for a limited duration. Moreover, the subscription can be intermittent. A subscription can entitle the subscriber to receive parking lot data and/or information. A subscription can be advertising-supported, or advertising-free. The advertising can be general, targeted to shoppers or users of the premises associated with the parking lot, and/or targeted specifically to a particular vehicle, person, or group of persons. By way of example, a general advertisement could be directed to a cold remedy. A premises-directed advertisement could advertise a special entree associated with a restaurant on or near the premises. A more targeted advertisement could be sent to an aging minivan, advertising the benefits of a new minivan model. An even more targeted advertisement could be selected based on a database lookup using the minivan's license plate, the database containing demograhic, income, spending, and/or lifestyle information about the owner and/or likely occupants of the minivan. Additional marketing techniques and databases that can be used for targeted advertising are described below.

Upon receiving a subscription request, system interaction device 1700 can check a database of authorized subscribers to learn if the request should be granted. In another embodiment, system interaction device 1700 can allow video data to be received without authorization and/or subscription. If subscriptions are utilized, system interaction device 1700 can initiate billing of a subscriber. The bill can be based on the actual data and/or information provided, such as, for example, whether reservations are provided, whether notifications are provided, and/or whether vehicle auto-pilot is provided. In another embodiment, the bill can be based on the data and/or information requested. In yet another embodiment, the bill can be based on what data and/or information a subscriber is able to access. In still yet another embodiment, the bill can be based, for example, on a flat fee, data and/or information update frequency, quality of service, and/or service priority.

At step 4030, system interaction device 1700, video interaction device 1400, and/or audio information device 1900 can grant subscriptions to the parking lot data and/or information to one or more interaction devices. As an illustrative example, system interaction device 1700 can grant to a vehicle interaction device 1500 a subscription to parking lot information by providing a decryption key by which the subscribing vehicle interaction device 1500 can decrypt the parking lot information and thereby "see" a map of parking lot 1320. Such a map can be, for example, a two-dimensional overhead representation or a three-dimensional representation depicted from a specified or variable location, such as above the building entrance or out the front windshield of the subscribing vehicle.

At step 4040, system interaction device 1700 can receive parking preferences from a vehicle interaction device 1500 and/or personal interaction device 1600. Preferences can include, for example, a desire for the closest parking space to the building entrance, building exit, parking lot entrance, parking lot exit, current vehicle location. Preferences can also include, for example, a desire for a parking space intermediate to two locations, such as the closest space to the entrance of two buildings (i.e. approximately midway between the two entrances). Moreover, preferences can include, for example, a desire for a handicapped space, a pull-through space, a wide space, a space having curb on one side, a space near and/or under a parking lot light, and/or a space having a specified number of empty spaces on each side thereof.

At step 4050, system interaction device 1700 can determine, based on the parking preferences, which empty parking space 1340 is optimal for vehicle 1520. This determination can be based on well-known optimization techniques. For example, to locate the closest empty parking space to a building entrance, system interaction device 1700 can measure a distance from a midpoint of each empty parking space to a midpoint of an entrance threshold, and select the parking space associated with the minimum distance measured.

At step 4060, system interaction device 1700 can transmit the location of optimal parking space 1345 to vehicle 1520 via vehicle interaction device 1500 and/or personal interaction device 1600. For example, optimal parking space 1345 can be displayed on a representation of parking lot 1320, which can be actual, symbolic, or a combination thereof. The representation can be two-dimensional, three-dimensional, multi-dimensional, or a combination thereof. The representation can be static and/or dynamic. If dynamic, the representation can be updated in real-time or after a delay. If actual, the representation can be enhanced.

At step 4070, system interaction device 1700 can receive a reservation request for optimal parking space 1345 (or any other parking space) from vehicle interaction device 1500 and/or personal interaction device 1600. System interaction device 1700 can accept or deny the reservation request. For example, if system interaction device 1700 realized that optimal parking space 1345 has become occupied since it was recommended, system interaction device 1700 can deny the reservation request and offer another parking space.

At step 4080, system interaction device 1700 can reserve optimal parking space 1345 for vehicle 1520. The reservation can be for fixed or unlimited duration. The reservation can be for one or more parking spaces. The reservation can include an assignment of the parking spaces to the reserving vehicle 1520 or person 1620. Moreover, system interaction device 1700 can indicate optimal parking space 1345 as filled on, for example, any transmitted video information, so that other subscribers see optimal parking space 1345 as filled, rather than empty.

At step 4090, system interaction device 1700 can allow an assignee vehicle 1520 to enter a reserved optimal parking space 1345 and discourage other vehicles from entering that parking space. Discouragement can take the form of showing optimal parking space 1345 as filled on vehicle interaction devices 1500 of the other vehicles. In another embodiment, this discouragement can take the form of warnings sent to a vehicle interaction device 1500 of a vehicle 1520 to which optimal parking space 1345 is not assigned. In yet another embodiment, system interaction device 1700 can cause parking indicator 1342 (shown in FIG. 1) to be visible or to display an appropriate message, such as, for example, "Reserved", "Do Not Enter", "Authorized Vehicle Only", "Tow-Away Zone", "Unauthorized Vehicles Will Be Towed At Owner's Expense", and/or "This Means You!". Such a message could disappear when assignee vehicle 1520 begins to enter the assigned parking space.

At step 4100, system interaction device 1700 can send commands to vehicle 1520. In one embodiment, those commands can turn off the lights and lock the doors of vehicle 1520. In another embodiment, those commands can direct vehicle 1520 to travel to optimal parking space 1345, park, and shut-down vehicle 1520. Thus, if the driver and passengers of vehicle 1520 exit vehicle 1520 at the entrance 1130 of building 1120, system interaction device 1700 can direct vehicle 1520 to travel unmanned to optimal parking space 1345 that has been reserved for vehicle 1520, park in optimal parking space 1345, shut-down, and secure vehicle 1520 (turn-off lights, lock doors, set alarm, etc.). In another embodiment, a one or more persons (driver, passenger, and/or person) corresponding to vehicle 1520 can request system interaction device 1700, vehicle interaction device 1500, and/or personal interaction device 1600 to send commands to vehicle 1520 to, for example, direct vehicle 1520 to optimal parking space 1345.

In yet another embodiment, when a person 1620 is ready to leave a building 1120, that person 1620 can request system interaction device 1700, vehicle interaction device 1500, and/or personal interaction device 1600 to send commands to vehicle 1520. As an illustrative example, those commands can direct vehicle 1520 to deactivate its security system, turn on its engine, adjust the cabin temperature and/or humidity, clear (defrost, defog, and/or wipe) the windows, adjust the sound system's attributes (input source, volume, balance, etc.), adjust the seats, turn on the driving lights, activate unmanned vehicle movement alerts (visual and/or auditory), engage transmission in Drive or Reverse as necessary to exit parking space 1345, release the parking brake, release the brake, engage the accelerator appropriately, and/or steer appropriately from optimal parking space 1345 to building exit 1115, where the door locks can be opened upon the approach of a person 1620 associated with vehicle 1520.

At step 4110, system interaction device 1700, vehicle interaction device 1500, and/or personal interaction device 1600 can request and/or receive status data and/or information from vehicle 1520. This status data and/or information can assist in safely commanding vehicle 1520. In another embodiment, this status data and/or information can alert person 1620 of any problem conditions with vehicle 1520. For example, person 1620 can be notified if the battery charge of vehicle 1520 drops below a predetermined level, or if a problem develops during the unmanned movement of vehicle 1520, or if vehicle 1520 is moved without the authorization and/or command of person 1620, or if the security of vehicle 1520 is compromised.

At step 4120, rather than causing vehicle 1520 to travel to building exit 115, parking lot data and/or information can be provided, which can, for example, assist person 1620 in traveling to the parking space of vehicle 1520, or in monitoring vehicle 1520 and/or parking lot 1320. For example, the parking space 1340 of a person's vehicle 1520 can be indicated on a map or other representation of parking lot 1320. Parking lot data and/or information can be provided on one or more monitors 1108 mounted in or outside building 1120 and connected to system interaction device 1700 and/or building interaction device 1100. Furthermore, parking lot data and/or information can be provided on any interaction device, such as, for example, vehicle interaction device 1500 and/or personal interaction device 1600.

A wide range of parking lot data and/or information can be detected, recognized, stored, and/or reported by video input device 1420, video interaction device 1400, and/or another interaction device. Parking lot data and/or information can include, for example, any of the following events: a vehicle colliding with another vehicle, a person, a parking impediment, and/or driving impediment; a vehicle speeding; a vehicle advancing too quickly on another vehicle, a person, a parking impediment, and/or driving impediment; a vehicle on fire, steaming, and/or dripping fluid; an unoccupied vehicle left running; an unoccupied vehicle's headlights illuminated longer than a specified time; a vehicle's door open longer than a specified time; an unoccupied vehicle's window open during a rain or snow shower; a vehicle that drops a muffler, package, and/or litter; a full parking lot; a vehicle parked beyond a specified period of time; a vehicle parked in an unauthorized location; a vehicle parked on a curb; a vehicle parked in more than one parking space; a vehicle parked too close to a boundary of a parking space; a vehicle blocking access or egress from a parking space; an unauthorized vehicle, person, and/or animal entering and/or within the parking lot; a vehicle being jacked-up; a vehicle with an open hood; a person running; a person chasing a vehicle, person, animal, and/or object; a person, animal, and/or object quickly moving away from a person; a person laying on the ground; a person falling; a person choking; a person slumped in a vehicle; a person hunched overly long; a person limping; a person with a weapon, such as a gun, knife, stick, mace, and/or the like; a person fighting with another; a person striking a person, animal, vehicle, and/or object; a crowd; a person throwing an object; a crowd forming; a person and/or animal loitering near a vehicle; a person and/or animal on a vehicle; a person and/or animal under a vehicle; a person and/or animal breaking into a vehicle; a person and/or animal scratching a vehicle; a person vandalising a vehicle and/or parking lot object; a person dropping litter; a person dropping an object; a person jacking up a vehicle; a person opening a hood; a person opening a door into a path of a moving vehicle; a person and/or animal in an overly hot vehicle cabin; a person and/or animal in an overly cold vehicle cabin; a person and/or animal in a vehicle cabin longer than a specified time; a child and/or animal left unattended in a vehicle; an object left unattended on a vehicle; an object left unattended in a parking lot; an object left unattended in a cart; an object placed on a vehicle roof prior to vehicle movement; a fire; and/or weather events such as precipitation; flooding; hail; icing; ice patches; and/or snow accumulation. Moreover, video-based parking lot information can be combined with information from other sources to infer or deduce various events.

Using parking lot data and/or information, system 1 can also estimate and/or determine weather conditions, such as temperature, humidity, wind speed, wind direction, and/or visibility. Temperature can be measured, for example, using infrared analysis of the images obtained from one or more video cameras of system 1. Relative humidity can be measured, for example, from inferences drawn based on the measured temperatures of a dry surface and of a condensing surface. Wind speed can be measured, for example, by inferrences drawn from viewing a wind sock. Wind direction can be measured, for example, by inferrences drawn from viewing a wind gauge. Visibility can be measured, for example, by inferrences drawn from focusing one or more video cameras on known objects at various distances and comparing the quality of images obtained.

Because of the ability of system 1 to recognize objects, vehicles, people, and/or animals, even more specific events can be recognized, stored, and/or reported including, for example, the arrival and/or position of an identified person, animal, vehicle, and/or object. As a particular example, system 1 can report the approach and/or arrival of a known vehicle, such as a building occupant's vehicle ("Daddy's home!"), a school bus, a carpool vehicle, an ice cream truck, a pizza delivery vehicle, an emergency vehicle, and/or a garbage truck.

Furthermore, upon recognizing an event, system 1 can take one or more actions. For example, if a vehicle 1520 has parked too close to a boundary of a parking space 1340, system 1 can take corrective action by notifying a vehicle interaction device 1500 associated with the vehicle of the event, and/or send sufficient signals to adjust the position of vehicle 1520. As another example, if the headlights of an unattended vehicle 1520 have been illuminated overly long, system 1 can take preventive action by notifying a personal interaction device 1600 associated with a driver 1620 of the vehicle of the event, and/or send sufficient signals to turn off the headlights. As yet another example, if a stray, wild, and/or undesired animal is approaching parking lot 1320, system 1 can take preventive action by activating a scaring device, such as a horn, a jack-in-the-box, or a drone to scare the animal away. In addition, system 1 can recognize the type of animal, apply a probability analysis to determine if the animal is likely to be, and/or if the animal's behavior suggests, the animal is rabid, and take additional corrective actions if necessary, such as notifying a subscriber, a security service, and/or an animal control service.

By way of further example, if an unauthorized vehicle enters parking lot 1320, system 1 can take corrective action by, for example, sounding an annunciator, flashing a display, or lighting an indicator warning the vehicle that it has entered without authorization and/or must leave. As another example, a vehicle 1520 has a flat tire, steaming radiator, or massive fluid leak, system 1 can take corrective action by notifying a personal interaction device 1600 associated with vehicle 1520 and offering to place a call for service. Depending on preferences entered by a person 1620, the call can be placed automatically. Other preferences can determine the events upon which to issue a notification, the type of notification, the intensity or annoyance level of the notification, when the notification should be sent and/or received, and/or where the notification should be sent and/or received.

As another particular example, the ability of system 1 to recognize specific faces can be utilized to check a face of a person 1620 against a database of faces. The database can be located within or outside of system 1. The database can contain, for example, faces of missing children, wanted criminals, suspected shoplifters and/or vandals. In another embodiment, the database can include contain, for example, faces of employees, vendors, suppliers, clients, customers, residents, and/or occupants. The faces contained in the database can be related to names, addresses, and/or other identifying information for the person whose face is contained in the database. Upon determining a match between a detected face and a face stored in the database, system 1 can record and/or report the match. Examples of face recognition systems, methods, and devices can be found in U.S. Pat. No. 5,991,429 (Coffin); U.S. Pat. No. 5,987,154 (Gibbon); U.S. Pat. No. 5,963,670 (Lipson); RE36,041 (Turk); U.S. Pat. No. 5,774,129 (Poggio); U.S. Pat. No. 5,842,194 (Arbuckle); U.S. Pat. No. 5,703,964 (Menon); U.S. Pat. No. 5,699,449 (Javidi); and/or U.S. Pat. No. 5,642,431 (Poggio), each of which is herein incorporated by reference in its entirety.

As an even more particularized example, once a face of a retail store customer has been recognized, system 1 can use the corresponding identifying information regarding the person, such as name and address, to search one or more databases for additional information about the recognized customer. This additional information can include marketing information such as, for example, geographic information, demographic information, income and/or wealth information, purchase history information, and/or property information. Such marketing information can be obtained, for example, from a source such as Acxiom Corportion of Conway, Ark. (on the Web at acxiom.com), via, for example, Acxiom's InfoBase, Smart Base, and/or Abilitec database service. Examples of this and other marketing information and techniques are disclosed in Acxiom's Case-in-Point Index (on the Web at acxiom.com/caseinpoint/cip-ix-home.asp), which is incorporated herein by reference in its entirety.

Continuing with the previous example, marketing information can be used by system 1 to offer promotions to the recognized customer, adjust prices to reflect the recognized customer's buying habits, and/or to direct the recognized customer to products and/or services more likely to meet that customer's needs. Knowing, for example a customer's prior purchasing habits and income, such as, that the customer periodically puchases dog food for a large dog and that the customer earns greater than $60,000 annually, a promotion for a new premium dog food can be offered to the customer when the customer enters the store, while a promotion for a new premium cat food can be withheld from the same customer.

Continuing with the example, if a shopping list for the customer has been transmitted to building interaction device 1100, the store can match promotions, prices, and/or products and services to the customer's shopping list. For example, if the customer of the example is seeking a 40 pound bag of Brand A dog food, a promotion can be offered for a 40 pound bag of the new Brand B premium dog food, rather than for a smaller sized bag of Brand B. Also, the customer can be provided with a map of the store showing where to find the 40 pound bag of Brand B dog food. Moreover, a 40 pound bag of Brand B dog food can be reserved for the customer when the promotion is provided to the customer. Furthermore, using her personal interaction device 1600, the customer can order the promotional 40 pound bag of Brand B dog food. In addition, the store can cause ordered dog food to be delivered to any location, including a location specified by the customer.

Moving away from these examples, one or more video input devices 1420 can be deployed in areas other than parking lot 1320, including for example, any outdoor and/or indoor area associated with building 1120. Moreover, one or more video input device 1420 can be deployed in outdoor areas not associated with building 1120, such as along a street approaching parking lot 1320. Furthermore, video data and or information can be provided to system 1 from one or more video cameras and/or interaction devices not associated with system 1.

As a particular example, using such video data and/or information, system 1 can detect, track, and report the position of a building occupant's cat as the cat wanders a neighborhood within a specified distance, or any distance, of building 1120. As yet another example, system 1 can detect, track, and report an unauthorized person, such as an unaccompanied toddler, approaching a swimming pool near and/or in building 1120. As a further example, system 1 can detect, track, and report that the mail truck has arrived, deposited mail in a building occupant's mailbox, and departed, with a visual, textual, and/or audible notification such as "You've got mail!".

As another example, audio data and/or information can be utilized by system 1 to recognize events in parking lot 1320, building 1120, and/or nearby areas. For example, system 1 can recognize any of the following parking lot events: a person yelling for help; a person yelling; a person crying; a person cursing; a person screaming; a person moaning; an animal making a sound such as a bark, cry, yelp, moan, squawk, and/or shriek; a vehicle screeching its tires; a vehicle revving its engine; a vehicle door closing; a vehicle with mechanical troubles; glass breaking; gunfire; an impact sound; an explosion; heavy rain; and/or high winds. Moreover, system 1 can utilize well-known techniques to recognize and interpret speech contained in the audio data and/or information, and to translate the interpreted speech into text. Examples of audio recognition systems, methods, and devices can be found in U.S. Pat. No. 6,014,468 (McCarthy); U.S. Pat. No. 6,006,175 (Holzrichter); U.S. Pat. No. 5,901,660 (Stein); U.S. Pat. No. 5,842,162 (Fineberg); U.S. Pat. No. 5,764,852 (Williams); U.S. Pat. No. 5,689,442 (Swanson), each of which is herein incorporated by reference in its entirety. Examples of speech recognition systems, methods, and devices can be found in U.S. Pat. No. 6,011,854 (Van Ryzin); U.S. Pat. No. 6,009,390 (Gupta); U.S. Pat. No. 6,006,185 (Immarco); and/or U.S. Pat. No. 6,006,181 (Buhrke), each of which is herein incorporated by reference in its entirety.

At step 4130, for a person walking or otherwise traveling to a vehicle 1520 parked in any parking space 1340, parking lot lights 1345 can be brightened along a path from building exit 1150 to the parking space. Similarly, for a person traveling from a vehicle 1520 parked in any parking space 1340, parking lot lights 1345 can be brightened along a path to building entrance 1130 from the parking space. The brightening of parking lot lights 1335 can be controlled by lighting interaction device 1200 (shown in FIG. 1) connected to system interaction device 1700 and/or to network 1750. Commands can be sent to lighting interaction device 1200 from building interaction device 1100, parking interaction device 1300, video interaction device 1400, vehicle interaction device 1500, personal interaction device 1600, and/or system interaction device 1700.

Although system 1 has been described in the context of a parking lot, it is not necessarily limited to that context. For example, system 1 can be extended to serve any outdoor or indoor premises. For example, system 1 can be configured to obtain, process, recognize, and/or detect video and/or audio events occuring on, near, and/or in an outdoor area such as a street, an alley, a sidewalk, a path, a garden, a deck, a pool, a yard, a common area, a wooded area, and/or a field. Similarly, system 1 can be configured to obtain, process, recognize, and/or detect video and/or audio events occuring on, near, and/or in an indoor area such as a mall, an aisle, a hallway, a closet, a room, an elevator, an escalator, a stairwell, and/or a warehouse.

Figure 5:
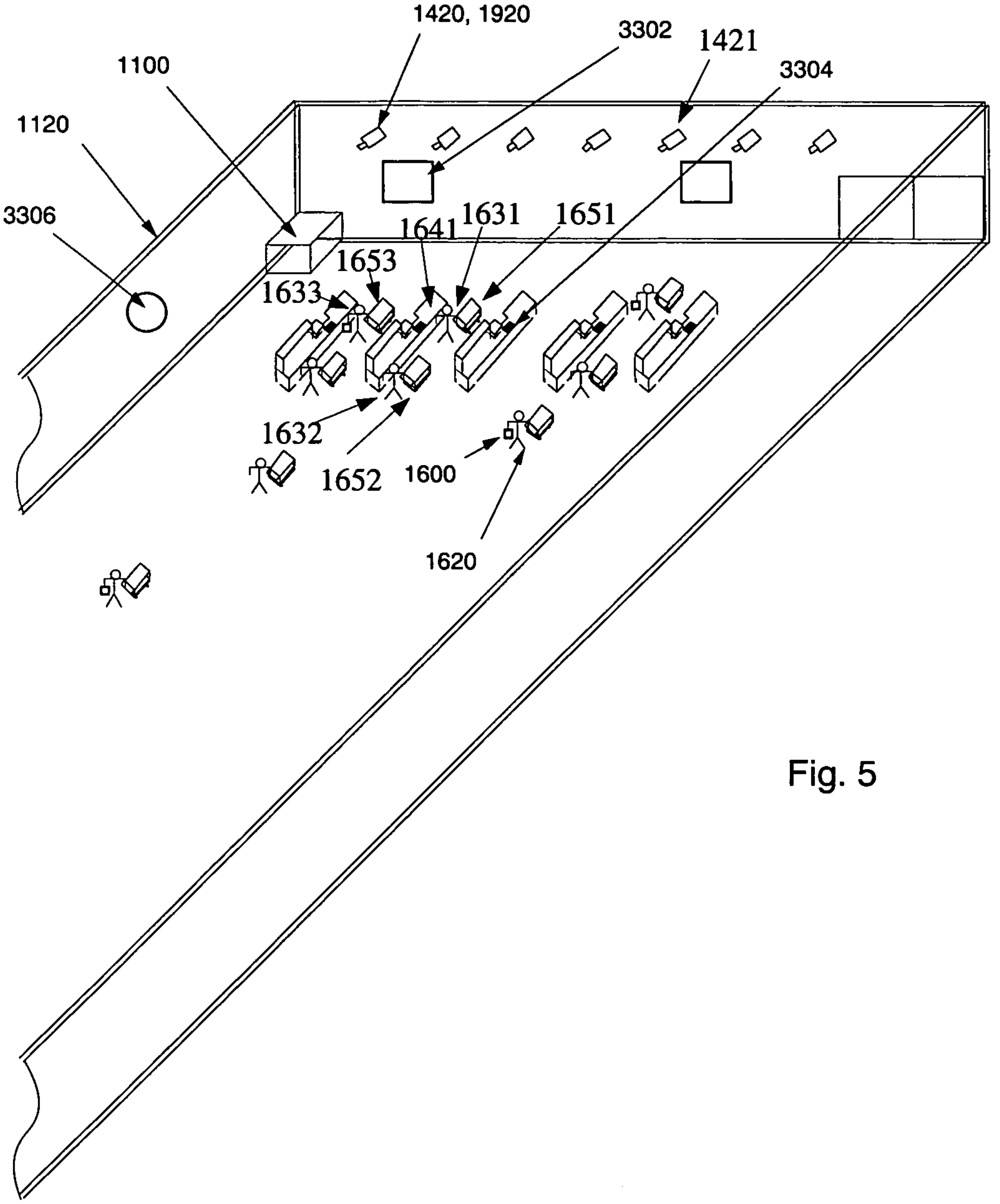
FIG. 5 is a perspective view of an embodiment of a System 1 from inside a building.

FIG. 5 is a perspective view of an inside of building 1120. Referring to FIG. 5, system 1 can provide additional useful functions. For example, utilizing building interaction device 1100, vehicle interaction device (not shown), and/or personal interaction device 1600, a person can obtain building, product, and/or inventory data and/or information. For example, using a vehicle interaction device (not shown), a driving person 1620 can query a web page for store building 1120 for the hours of that store building 1120 is open to the public, any sales or discounts the store is offering, or the return policy of the store.

By way of further example, a person 1620 can use a personal interaction device 1600 to query a store's product database to learn whether that store carries a particular product, or what particular products the store carries in a given product category, or the specifications for a particular product carried by the store. As yet another example, a person can use a personal interaction device 1600 to query one or more of a store's databases for the quantity of a product on the shelf, in stock, and/or on back-order, the price of a product, the unit price (price per unit weight) for the product, the expiration date of the product, the shelf life of the product, the expected restocking date of the product, the sale price history of a product, the planned sales affecting a product, competitive products to the product, etc. To facilitate this query, a person 1620 can use a scanner 3300 (shown in FIG. 3) attached to or integral to personal interaction device 1600 to enter an SKU or UPC code from a product, shelf label, advertisement, and/or catalog to query one or more of a store's databases.

Building interaction device 1100 can notify persons of data and/or information of potential interest. Such notification can be, for example, displayed on monitor 3302 connected to building interaction device 1100, announced on speaker 3306 connected to building interaction device 1100, transmitted to personal interaction device 1600 for private display to person 1620, and/or transmitted to vehicle interaction device (not shown) to reach a person 1620 who has left building 1120. For example, building interaction device 1100 can notify a person than an ordered product is ready for pickup. Such a product order can be for photographs, prescription pharmaceuticals, a full service item requiring building personnel to deliver a product from a building's warehoused inventory, or another product requiring the services of building personnel. Similarly, building interaction device 1100 can notify a person that building personnel are ready to provide a service to the person, such as providing a haircut, manicure, eye exam, consultation, etc. Similar notifications also can be sent to personal interaction device 1600. As yet another example, building interaction device 1100 can notify a person 1620 of an emergency within building 1120, and can indicate a path to an emergency scene and/or an escape path from building 1120.

Building interaction device 1100 can continuously provide data and/or information of potential interest to persons, drivers, passengers, building personnel, and/or others. For example, in the case of a retail store, building interaction device 1100 can provide checkout line data and/or information to persons 1620, 1631, 1632, 1633 to assist in minimizing their wait in checkout lines. Checkout line data and/or information can be obtained from input devices 3304 associated with checkout lines such as, for example, checkout registers, one or more scanners including UPC scanners and/or credit/debit card scanners associated with the checkout registers, and/or one or more video cameras 1421 aimed at one or more checkout lines. As shown in FIG. 5, from the perspective of at least video camera 1421, any number of moving objects can be at least partially blocked, obscured, and/or overlapped by one or more additional simultaneously moving objects. For example, from the viewpoint of video camera 1421, moving cart 1651 can at least partially block, obscure, and/or overlap moving person 1631, and/or a moving object, such as a conveyor, cashier, and/or products, associated with check-out line 1641. Likewise, person 1631 can at least partially block, obscure, and/or overlap person 1632, person 1633, cart 1652, cart 1653, and/or a moving object, such as a conveyor, cashier, and/or products, associated with check-out line 1641, etc. Checkout line data and/or information can include statistics such as the identity and location of open checkout lines, the number of persons in each open line, the average wait for each line, the average speed for each line, and/or the total expected wait for the next person to enter each line. Checkout line data and/or information can also include any restrictions on each line, such as a limit to the number of products that a person can purchase in a line, or a limit to the method of purchase allowed in a line (such as cash only or no personal checks). Checkout line data and/or information can also assist building employees in recognizing delays that need attention, and/or cashiers that are underperforming and thus may need additional training. As another example, building interaction device 1100 can provide weather information, news information, promotional information, etc.

Persons 1620 can use their personal interaction devices 1600 to interact with one another. For example, persons 1620 can interact with others in their party to coordinate a departure time and location. As another example, persons 1620 can inquire about and and share experiences with other persons 1620 regarding a product of interest.

Moreover, a person 1620 can use a personal interaction device 1600 to communicate with building employees via building interaction device 1100 and/or system interaction device (not shown). For example, a person 1620 can issue a paging message requesting assistance with removing a product from a high overhead shelf, or with loading a heavy or bulky product into a shopping cart. As another example, a person can send a request for a building employee to explain how a product is used or assembled. By way of further example, a person can call a building manager to report a spill, injury, or complaint.

Furthermore, a person can use a personal interaction device 1600 to store and/or retrieve data and/or information of interest to the person. For example, a person can enter and store a shopping list on personal interaction device 1600, and can check-off products from that list on personal interaction device 1600 as products are added to the person's cart and/or purchased. The shopping list can track the price for each product, the tax deductability of the product, and a running total.

The embodiments described herein are intended to be exemplary and not limiting. Many variations on these embodiments will be apparent to those of skill in the art, and each such variation is contemplated by the inventors to be within the scope of the claimed invention.

What is claimed is:

1. A method for managing a parking lot, comprising:

via a processor, transforming received parking lot data comprising video data and audio data into parking lot information comprising information about a plurality of overlapping moving parking lot objects, the parking lot information comprising an identification of at least one of the plurality of overlapping moving parking lot objects, the identification determined by the processor; and transmitting the parking lot information to an interaction device.

2. The method of claim 1, further comprising:

receiving data from the interaction device.

3. The method of claim 1, further comprising:

receiving vehicle data from the interaction device.

4. The method of claim 1, further comprising:

transforming vehicle data into vehicle information that comprises non-audio information.

5. The method of claim 1, further comprising:

receiving a request for the parking lot information.

6. The method of claim 1, further comprising:

charging a fee for the parking lot information.

7. The method of claim 1, further comprising:

identifying an available parking space.

8. The method of claim 1, further comprising:

identifying an optimal parking space.

9. The method of claim 1, further comprising:

receiving a request for access to a parking space.

10. The method of claim 1, further comprising:

receiving a request to reserve a parking space.

11. The method of claim 1, further comprising:

reserving a parking space.

12. The method of claim 1, further comprising:

accepting a reservation for a parking space.

13. The method of claim 1, further comprising:

designating a reserved parking space as filled.

14. The method of claim 1, further comprising:

assigning a parking space.

15. The method of claim 1, further comprising;

discouraging a vehicle from entering a parking space.

16. The method of claim 1, further comprising:

charging a fee for access to the parking lot.

17. The method of claim 1, further comprising:

charging a fee for access to a parking space.

18. The method of claim 1, further comprising:

charging a fee for reserving a parking space.

19. The method of claim 1, further comprising:

metering use of a parking space.

20. The method of claim 1, wherein said transforming step includes:

recognizing a parking lot object.

21. The method of claim 1, wherein said transforming step includes:

identifying a parking lot object.

22. The method of claim 1, wherein said transforming step includes:

converting a parking lot object into a symbolic object.

23. The method of claim 1, further comprising:

transmitting information regarding a non-moving parking lot object.

24. The method of claim 1, further comprising:

transmitting information to the interaction device based on an identity of a parking lot object.

25. The method of claim 1, further comprising:

transmitting a location of a parking lot object to the interaction device.

26. The method of claim 1, further comprising:

adjusting parking lot lighting based on the parking lot data.

27. The method of claim 1, further comprising:

adjusting parking lot lighting based on data received from the interaction device.

28. The method of claim 1, further comprising:

transmitting information regarding a parking lot event.

29. The method of claim 1, further comprising:

communicating the parking lot information via a web page.

30. The method of claim 1, further comprising:

transmitting a location of a vehicle.

31. The method of claim 1, further comprising:

transmitting a status of a vehicle.

32. The method of claim 1, wherein the parking lot data comprises vehicle-related audio data.

33. The method of claim 1, wherein the parking lot data comprises vehicle-related video data.

34. The method of claim 1, wherein the parking lot data comprises weather data.

35. The method of claim 1, wherein the parking lot information comprises audio information.

36. The method of claim 1, wherein the parking lot information comprises visual information.

37. The method of claim 1, wherein the parking lot information comprises weather information.

38. The method of claim 1, wherein the parking lot information comprises a map.

39. The method of claim 1, wherein the parking lot information comprises visual representations of static objects.

40. The method of claim 1, wherein the parking lot information comprises visual representations of moving objects.

41. The method of claim 1, wherein the interaction device is a vehicle interaction device.

42. The method of claim 1, wherein the interaction device is permanently attached to a vehicle.

43. The method of claim 1, wherein the interaction device is not permanently attached to a vehicle.

44. The method of claim 1, wherein the interaction device is portable.

45. A computer-readable medium storing thereon instructions for:

transforming parking lot data comprising video data and audio data into parking lot information comprising information about a plurality of overlapping moving parking lot objects, the parking lot information comprising an identification of at least one of the plurality of overlapping moving parking lot objects, the identification determined by the processor; and transmitting the parking lot information to an interaction device.

46. A system for managing a parking lot, comprising:

a processor adapted to:

transform received parking lot data comprising video data and audio data into parking lot information comprising information about a plurality of overlapping moving parking lot objects, the parking lot information comprising an identification of at least one of the plurality of overlapping moving parking lot objects, the identification determined by the processor; and provide the parking lot information for transmission to an interaction device.

47. A method for managing a parking lot, comprising:

via a processor, transforming parking lot data comprising video data and audio data into parking lot information that comprises information other than an availability status, a quantity, a time, and a location of one or more parking spaces, the parking lot information comprising information about a plurality of overlapping moving parking lot objects, the parking lot information comprising an identification of at least one of the plurality of overlapping moving parking lot objects, the identification determined by the processor; and transmitting the parking lot information to a mobile interaction device.

* * * * *

UNITED STATES PATENT AND TRADEMARK OFFICE
CERTIFICATE OF CORRECTION

PATENT NO. : 7,123,166 B1
APPLICATION NO. : 10/961128
DATED : October 17, 2006
INVENTOR(S) : Michael N. Haynes and Pamela E. Haynes It is certified that error appears in the above-identified patent and that said Letters Patent is hereby corrected as shown below:

On the title page (60), add the following:
Related U.S. Application Data

This application is a continuation application of United States Patent Application Serial Number 09/714,452, filed 17 November 2000, and titled "Method for Managing a Parking Lot", now United States Patent No. 6,816,085.

On the title page (56) add the following:
References Cited

U.S. Patent Documents
4603390 July 1986 Mehdipour
5170352 December 1992 McTamaney
5410346 April 1995 Saneyoshi
5432508 July 1995 Jackson
5448487 September 1995 Aral
5497314 March 1996 Novak
5642431 June 1997 Poggio
5648906 July 1997 Amirpanahi
5675661 October 1997 Richman
5675663 October 1997 Koemer
5689442 November 1997 Swanson
5699449 December 1997 Javidi
5703964 December 1997 Manon
5712830 January 1998 Ross
5745052 April 1998 Matsuyama

UNITED STATES PATENT AND TRADEMARK OFFICE

CERTIFICATE OF CORRECTION

PATENT NO. : 7,123,166 B1 
APPLICATION NO. : 10/961128
DATED : October 17, 2006
INVENTOR(S) : Michael N. Haynes and Pamela E. Haynes It is certified that error appears in the above-identified patent and that said Letters Patent is hereby corrected as shown below:

U.S. Patent Documents (cont'd)

| | | |
|---|---|---|
| 5748107 | May 1998 | Kersken et al. |
| 5764852 | June 1998 | Williams |
| 5774129 | June 1998 | Poggio |

Signed and Sealed this

Twenty-second Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 7,123,166 B2

APPLICATION NO. : 10/961128
DATED : October 17, 2006
INVENTOR(S) : Michael N. Haynes and Pamela E. Haynes It is certified that error appears in the above-identified patent and that said Letters Patent is hereby corrected as shown below:

ON THE TITLE PAGE:
Please insert

Item 62
Related U.S. Application Data

This application is a continuation application of United States Patent Application Serial Number 09/714,452, filed 17 November 2000, and titled “Method for Managing a Parking Lot”, now United States Patent No. 6,816,085.

Item 56
References Cited

U.S. Patent Documents
4603390 July 1986 Mehdipour
5170352 December 1992 McTamaney
5410346 April 1995 Saneyoshi
5432508 July 1995 Jackson
5448487 September 1995 Arai
5497314 March 1996 Novak
5642431 June 1997 Poggio
5648906 July 1997 Amirpanahi
5675661 October 1997 Richman
5675663 October 1997 Koerner
5689442 November 1997 Swanson
5699449 December 1997 Javidi
5703964 December 1997 Menon
5712830 January 1998 Ross
5745052 April 1998 Matsuyama
5748107 May 1998 Kersken et al.
5764852 June 1998 Williams
5774129 June 1998 Poggio
5828769 October 1998 Burns
5842162 November 1998 Fineberg
5842194 November 1998 Arbuckle
5845268 December 1998 Moore
5850470 December 1998 Kung
RE36041 January 1999 Turk
5864305 January 1999 Rosenquist
5877969 March 1999 Gerber
5901246 May 1999 Hoffberg
[continued on page 2]

UNITED STATES PATENT AND TRADEMARK OFFICE

CERTIFICATE OF CORRECTION

PATENT NO. : 7,123,166 B2 
APPLICATION NO. : 10/961128
DATED : October 17, 2006
INVENTOR(S) : Michael N. Haynes and Pamela E. Haynes It is certified that error appears in the above-identified patent and that said Letters Patent is hereby corrected as shown below:

Item 56
References Cited

U.S. Patent Documents [continued from page 1]
5901660 May 1999 Stein
5901660 May 1999 Stein
5912980 June 1999 Hunke
5920477 July 1999 Hoffberg
5923791 July 1999 Hanna
5940481 August 1999 Zeitman
5946675 August 1999 Sutton
5963670 October 1999 Lipson
5974175 October 1999 Suzuki
5982934 November 1999 Villalba
5983161 November 1999 Lemelson
5986357 November 1999 Myron
5987154 November 1999 Gibbon
5991429 November 1999 Coffin
6006175 December 1999 Holzrichter
6006181 December 1999 Buhrke
6006185 December 1999 Immarco
6009390 December 1999 Gupta
6011854 January 2000 Van Ryzin
6014468 January 2000 McCarthy
6058352 May 2000 Lu
6081750 June 2000 Hoffberg
6092919 July 2000 Calise
6107942 August 2000 Yoo et al.
6134525 October 2000 Iwahashi
6144910 November 2000 Scarlett
6285297 September 2001 Ball
6340935 January 2002 Hall
6501391 December 2002 Racunas, Jr.
6570608 May 2003 Tserng

UNITED STATES PATENT AND TRADEMARK OFFICE

CERTIFICATE OF CORRECTION

PATENT NO. : 7,123,166 B2 Page 3 of 3
APPLICATION NO. : 10/961128
DATED : October 17, 2006
INVENTOR(S) : Michael N. Haynes and Pamela E. Haynes It is certified that error appears in the above-identified patent and that said Letters Patent is hereby corrected as shown below:

Item 56
References Cited

Other References

Print-out from http://www.fastoll.com/smart.htm, printed Feb. 8, 2001, 1 page. .
Print-our from http://www.eyecst.com, printed Jan. 10, 2000, 12 pages. .
Noguchi, Yuki, “The View From the Bridge--and Beltway”, Washington Post, Business section, p. 9, Jan. 10, 2000.

Signed and Sealed this

Twenty-first Day of August, 2007

JON W. DUDAS
*Director of the United States Patent and Trademark Office*